(12) United States Patent
Delprat et al.

(10) Patent No.: US 11,389,675 B2
(45) Date of Patent: Jul. 19, 2022

(54) QUICK DONNING COMFORTABLE RESPIRATORY MASK SYSTEM FOR AIRCRAFT PILOT

(71) Applicant: Safran Aerotechnics, Plaisir (FR)

(72) Inventors: Jean-Baptiste Delprat, Chaville (FR); Olivier Potet, La Villedu Bois (FR); Frédéric Berthet, Saulx Marchais (FR); Benoit Bruiant, Andresy (FR)

(73) Assignee: SAFRAN AEROTECHNICS SAS, Plaisir (FR)

( * ) Notice: Subject to any disclaimer, the term of this patent is extended or adjusted under 35 U.S.C. 154(b) by 347 days.

(21) Appl. No.: 16/624,561

(22) PCT Filed: Jul. 4, 2018

(86) PCT No.: PCT/IB2018/000962
§ 371 (c)(1),
(2) Date: Dec. 19, 2019

(87) PCT Pub. No.: WO2019/008446
PCT Pub. Date: Jan. 10, 2019

(65) Prior Publication Data
US 2020/0215361 A1 Jul. 9, 2020

Related U.S. Application Data

(60) Provisional application No. 62/661,385, filed on Apr. 23, 2018, provisional application No. 62/660,408, (Continued)

(51) Int. Cl.
*A62B 18/08* (2006.01)
*A62B 7/00* (2006.01)
(Continued)

(52) U.S. Cl.
CPC .............. *A62B 18/084* (2013.01); *A62B 7/00* (2013.01); *A62B 18/02* (2013.01); *A62B 18/08* (2013.01);
(Continued)

(58) Field of Classification Search
CPC ......... A62B 18/084; A62B 7/00; A62B 18/02; A62B 18/08; A62B 25/00; A62B 7/14;
(Continued)

(56) References Cited

U.S. PATENT DOCUMENTS

| 1,356,708 A | 10/1920 | Goodyear |
| 2,814,293 A * | 11/1957 | Gabb .................. A62B 18/084 128/201.19 |

(Continued)

FOREIGN PATENT DOCUMENTS

| EP | 0288391 | 10/1988 | |
| GB | 2454491 A * | 5/2009 | ............. A62B 17/04 |
| WO | 2003005765 | 1/2003 | |

OTHER PUBLICATIONS

International Patent Application No. PCT/IB2018/000962, International Search Report and Written Opinion, dated Nov. 6, 2018.

*Primary Examiner* — Tu A Vo
(74) *Attorney, Agent, or Firm* — Kilpatrick Townsend & Stockton LLP

(57) ABSTRACT

A respiratory equipment for an aircraft, a pilot or first officer of the aircraft forming a user of the respiratory equipment, the respiratory equipment comprising a head armature, configured to be worn on the user's head, a respiratory mask configured to be applied, in a use position around the mouth and nose of a user, an inflatable harness configured to be coupled to a pressurized gas source, an inflation of the inflatable harness causing an extension of the inflatable harness such that the respiratory mask can be brought opposite the mouth and nose of a user, and a purge of the (Continued)

inflatable harness causing a constrained application of the inflatable harness against the mouth and nose of a user, wherein the head armature comprises at least an occipital member, and a front cradle for receiving and lodging the respiratory mask in a waiting position, wherein the inflatable harness is fixed to the occipital member and the inflatable harness is coupled to the respiratory mask.

19 Claims, 6 Drawing Sheets

Related U.S. Application Data filed on Apr. 20, 2018, provisional application No. 62/528,760, filed on Jul. 5, 2017.

(51) Int. Cl.
    *A62B 18/02*     (2006.01)
    *A62B 25/00*     (2006.01)
    *B64D 11/00*     (2006.01)
    *A62B 7/14*     (2006.01)

(52) U.S. Cl.
    CPC .............. *A62B 25/00* (2013.01); *B64D 11/00* (2013.01); *A62B 7/14* (2013.01); *A62B 25/005* (2013.01); *B64D 2231/025* (2013.01)

(58) Field of Classification Search
    CPC ....... A62B 25/005; A62B 18/00; A62B 18/04; B64D 11/00; B64D 2231/025; A41D 13/1161; A61M 16/0683
See application file for complete search history.

(56) References Cited

U.S. PATENT DOCUMENTS

| | | | | |
|---|---|---|---|---|
| 3,599,636 | A | * | 8/1971 | Gutman ............... A62B 18/084 128/207.11 |
| 5,036,846 | A | * | 8/1991 | Aulgur ................. A62B 18/084 128/205.24 |
| 5,623,923 | A | * | 4/1997 | Bertheau .............. A62B 18/084 2/6.1 |
| 5,941,245 | A | * | 8/1999 | Hannah ................ A62B 18/084 128/207.11 |
| 5,954,052 | A | * | 9/1999 | McDonald ............ B64D 10/00 206/485 |
| 5,957,132 | A | | 9/1999 | McDonald et al. |
| 6,039,045 | A | * | 3/2000 | Bertheau .............. A62B 18/084 128/207.11 |
| 6,401,716 | B1 | * | 6/2002 | Sword ................ A41D 13/1184 2/427 |
| 2003/0000001 | A1 | * | 1/2003 | McDonald ........... A62B 18/084 2/6.3 |
| 2004/0244801 | A1 | * | 12/2004 | Hannah ................. A62B 18/08 128/207.11 |
| 2005/0210556 | A1 | * | 9/2005 | Martinez ............. A62B 18/082 2/9 |
| 2013/0213403 | A1 | * | 8/2013 | Bruckert ................. A62B 7/14 128/206.27 |
| 2013/0220329 | A1 | * | 8/2013 | Gredat ................ A62B 18/084 128/205.25 |
| 2014/0290665 | A1 | * | 10/2014 | Libis ...................... B64D 10/00 128/206.27 |
| 2016/0228732 | A1 | * | 8/2016 | Cooper ................ A62B 18/084 |
| 2016/0375275 | A1 | * | 12/2016 | Cooper .................... A62B 9/04 128/205.25 |

* cited by examiner

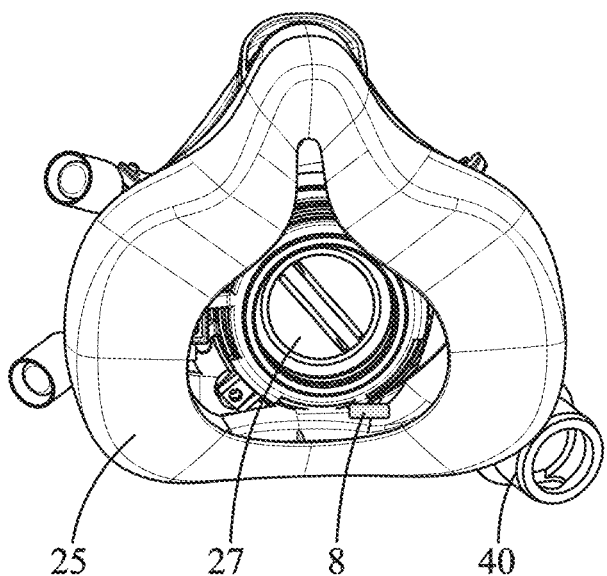
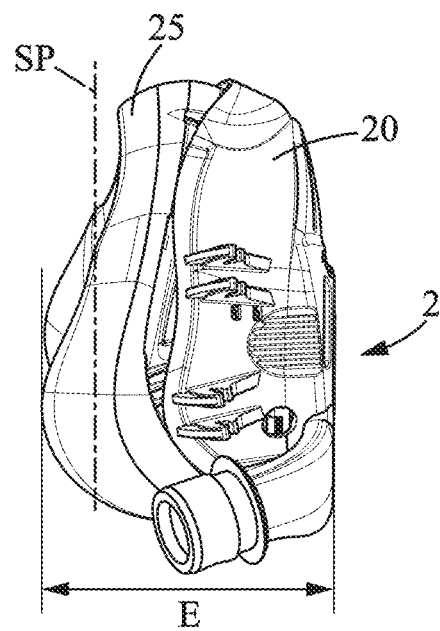
FIG. 7A  FIG. 7B
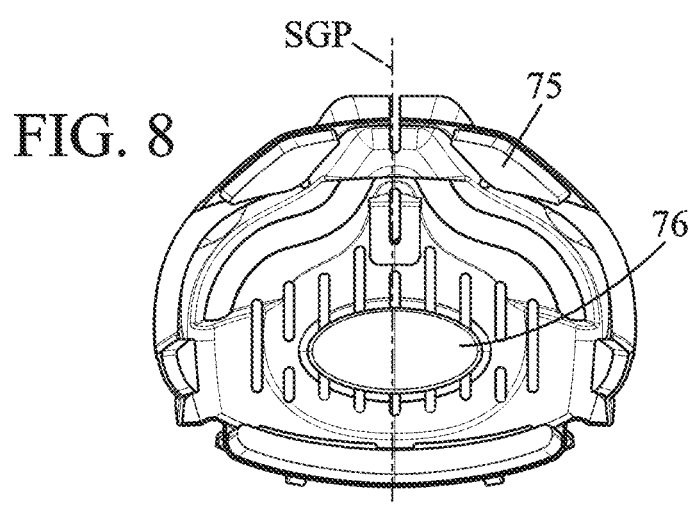
FIG. 8
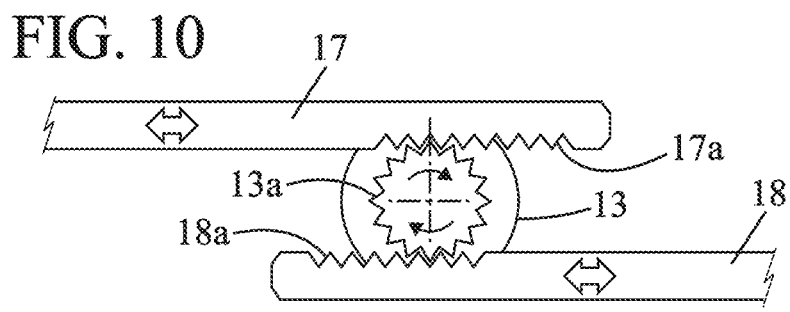
FIG. 10

QUICK DONNING COMFORTABLE RESPIRATORY MASK SYSTEM FOR AIRCRAFT PILOT

The project leading to this application has received funding from the Clean Sky 2 Joint Undertaking under the European Union's Horizon 2020 research and innovation program under grant agreement No CS2-LPA-GAM-2014-2015-0I.

FIELD OF THE INVENTION

The present disclosure relates to respiratory equipment for aircraft pilots.

BACKGROUND OF THE DISCLOSURE

There is a trend to push and/or oblige pilots and/or first officers of aircrafts to wear a respiratory equipment in a preventive mode, such respiratory equipment being intended to avoid hypoxia phenomenon in case of decompression at certain cruising altitudes.

More precisely, a preventive wear of a respiratory equipment is required for cruising altitudes above 41 kfeet and/or if only one pilot is present in the flight deck for cruising altitudes above 25 kfeet. This preventive wear may be also required for some flight domain conditions and/or some geographical areas (e.g. high mountains area).

Under this perspective, there is a need to propose new solutions to favor the practicality and comfort of respiratory equipment.

SUMMARY OF THE DISCLOSURE

According to one aspect of the present invention, there is disclosed a respiratory equipment for an aircraft, a pilot or first officer of the aircraft forming a user of the respiratory equipment, the respiratory equipment comprising:
  a head armature, configured to be worn on the user's head,
  a respiratory mask configured to be applied, in a use position (P1) around the mouth and nose of a user,
  an inflatable harness configured to be coupled to a pressurized gas source, an inflation of the inflatable harness causing an extension of the inflatable harness such that the respiratory mask can be brought opposite the mouth and nose of a user, and a purge of the inflatable harness causing a constrained application of the inflatable harness against the mouth and nose of a user,
wherein the head armature comprises at least an occipital member, and a front cradle for receiving and lodging the respiratory mask in a waiting position (P2),
wherein the inflatable harness is fixed to the occipital member at a back portion and the inflatable harness is coupled to the respiratory mask at a front portion.

Thanks to these dispositions, it is very easy, quick and practical to place the mask on the mouth and nose of a user/pilot; this increases safety and availability for the pilot who is instantly available to perform other critical tasks. These dispositions provide direct and quick access to the mask in its waiting position.

The head armature is comfortable to wear, it can fit to all anthropometrics of pilot/first officer and it can fit to many hairstyles.

The user has just to grasp the mask at his/her forehead area, said grasp action which, by the way of inflation, increases the length of the inflatable harness, and lower it to place it opposite his/her mouth/nose and the user releases the mask to trigger harness head squeezing and constrained mask application therefrom.

The term "head armature" means here a structure encompassing the skull of the user, preferably this is a discontinuous structure, with various adjustable portions.

The term "occipital member" means a part bearing on the rear part of the user's head having a sufficient bearing area to distribute and spread the pulling effort exerted by the inflatable harness.

The term "front cradle" can also be used as "forehead cradle".

The clause "the inflatable harness is fixed to the occipital member at a back portion" means that at least a back portion of the inflatable harness is fixed to the occipital member, said otherwise only the back portion of the tubes are fixed to the occipital member, and the rest of the tubes of the inflatable harness is not fixed to the occipital member and free to move therefrom.

The term "use position" for the respiratory mask means the mask is applied in an airtight manner on the mouth and nose, thanks to a seal applied to the face of the user.

It shall be understood that the so-called "inflatable harness" can comprise two inflatable tubes or one single inflatable tube.

In various embodiments of the invention, one may possibly have recourse in addition to one and/or other of the following arrangements, taken alone or in combination.

According to one option, the head armature may comprise one or two occipital straps, with a length adjustment system, preferably controlled by a rotary knob. Whereby, it is possible to adjust the equipment to the anthropometry metrics of the user, it is readily possible to adjust the equipment to the size and shape of the skull, ears, hair of the user.

According to one option, the head armature may comprise a top strap, preferably with a length adjustment system. Whereby, it is possible to adjust the equipment to the anthropometry metrics of the user, it is readily possible to adjust the equipment to the size and shape of the skull, ears, hair of the user. The top strap bears on the top of the user's head at a place where users have usually the yoke/bracket of a conventional headset.

According to one option, the head armature may comprise a left parietal bearing element, and a right parietal bearing element. These parietal bearing elements distribute and spread the squeezing effort exerted by the inflatable harness.

According to one option, each of the left and right parietal bearing elements forms a socket for the attachment of headsets. These parietal bearing elements may form a robust socket to attach headsets. Such headsets may be headsets with two stable positions with regard to the parietal elements, one corresponds to the headset pressed against the ear, and another one corresponds to the headset substantially away from the ear.

According to one option, the head armature may comprise foam pads configured to be interposed between the head armature and the user's head (UH). Advantageously, this improves user comfort, and this increases acceptance of permanent wear.

According to one option, there is provided, on the respiratory mask, at least one harness inflation control tab, which triggers, when depressed, an inflation of the inflatable harness. Preferably there are provided two harness inflation control tabs, with at least one movable towards the other. A pinch action (grasping the mask) triggers harness inflation. It is very simple and fool-proof. The tabs are preferably of a bright color, e.g. red.

According to one option, the respiratory equipment may comprise a vibrator device arranged preferably at the front cradle (integrated or adjacent to). This constitutes an intuitive means to give an alert/incentive to wear the mask on the mouth.

According to one option, the respiratory equipment may comprise a miniaturized microphone, preferably arranged in the respiratory mask. Audio communications are therefore rendered possible and efficient thanks to the integrated microphone.

According to one option, the respiratory equipment may comprise a bone-conduction microphone, arranged in the head armature. Audio communications are therefore rendered possible and efficient thanks to the integrated microphone.

According to one option, the respiratory equipment may comprise two loudspeakers arranged at the parietal bearing elements. Optionally the two loudspeakers are integrated respectively in the left and right parietal bearing elements. Optionally the two loudspeakers use bone conduction and are of bone-conduction type.

Audio communications is therefore rendered possible and efficient thanks to the loudspeakers.

According to one option, the respiratory equipment is compatible with the personal headset of the user. Since the loudspeakers of the respiratory equipment are optional, when they are absent, disabled or removed, the user (pilot or first officer) can install his/her own headset on the inflatable harness. The inflatable tubes are thin and they don't prevent bringing additional headset on/over the ears.

According to one option, the inflatable harness comprises two inflatable tubes. This is a reliable and simple configuration. However configuration with only one inflatable tube is also considered.

According to one option, the inflatable harness comprises two inflatable tubes kept away from one another by spacer members. Thanks to the space left between lower and upper inflatable tubes, there is advantageous enough room to accommodate comfortably the ears of the user (UE).

According to one option, at the coupling area where the inflatable harness is coupled to the respiratory mask, there is provided a flexible attachment. Comfort is optimized according to the shape of the users face. More precisely, when the tubes are fully extended, they tend to a circle shape and tend move away from the center axis and at the mask attachment area, the tubes are angularly open, which eases the installation of the mask, even when the user wears glasses.

According to one option, at the coupling area where the inflatable harness is coupled to the respiratory mask there is provided an angular stop such that the angle of each tube of the harness with regard to the sagittal plane is at least 30°. At the mask interface, the tubes are angularly open when inflated which eases the installation of the mask, even when the user wears glasses.

According to one option, the respiratory equipment may comprise a gas regulator arranged away from the respiratory mask, preferably equipped with a fixing clamp on a belt/safety harness, and with a flexible gas supply conduit coupled to the respiratory mask to supply respirable gas from a respirable gas supply device (such as tank-stored or chemical O2, or like solutions) Advantageously, the mask is light, the weight of the regulator is not supported by the user's head.

According to one option, there is provided a linking member to maintain together the flexible gas supply conduit and the lower inflatable tube of the inflatable harness.

Advantageously the flexible gas supply conduit ("O2 tube") is held toward the back of the head and exhibits no hindrance for the pilot in the front area (the user U has freedom to use conveniently his/her arms).

According to one option, on the occipital member, the lower inflatable tube and the upper inflatable tube of the inflatable harness are fixed at a predefined distance from one another. Advantageously it distributes and spreads bearing efforts on the back of the user's head when the mask is in use position.

According to one option, the occipital member exhibit a bearing area of at least 5 cm$^2$, preferably of at least 10 cm$^2$; where comfort and stability are optimized; there is no peak pressure on the back of the user's head but a smooth widely distributed pressure.

According to one option, the front cradle comprises retention means for maintaining therein the respiratory mask in the waiting position; said retention means may comprise a magnet and counterpart, or complementary shapes, or hooks&loops straps (Velcro™) Advantageously said retention means prevent an inadvertent fall of the respiratory mask in case of air turbulence and/or shaking, or if the user U bends forwards.

According to one option, the respiratory mask exhibits a thickness (E) along a direction generally perpendicular to the facial seal, with E<70 mm. Overall size is thus reduced when compared to mask with regulator included therein.

According to one option, when the respiratory mask is in the waiting position (P2), the respiratory mask forms a vertical projection (DZ) from the top of the head of the user, said vertical projection is less than 50 mm. Advantageously, there is no contact with the flight deck top wall/ceiling.

According to one option, the inflatable harness is such that the length of the inflatable tubes in the inflated state is at least 130% compared with the length of the inflatable tubes in the purged state. The user can easily pass the mask and harness around the face even when wearing glasses, long nose, . . . .

According to one option, the respiratory equipment may further comprise a visor/goggles device removably attachable on the respiratory mask. Thereby, the pilot/user can put this eye protection when he/she wishes to or under any required conditions.

According to one option, the respiratory equipment may further comprise a sensor configured to detect a condition when the respiratory mask is in the use position (P1), and therefore the avionics system automatically switches audio channel to the microphone and loudspeakers provided in the respiratory equipment.

BRIEF DESCRIPTION OF THE DRAWINGS

Other features and advantages of the invention appear from the following detailed description of one of its embodiments, given by way of non-limiting examples, and with reference to the accompanying drawings, in which:

FIGS. 7A and 7B show some aspects of the respiratory mask, seen respectively in elevation and in side view, FIG. 8 shows the front cradle from behind with foam pads, FIG. 10 shows one example of occipital straps adjustment system.

DETAILED DESCRIPTION OF THE DISCLOSURE

In the figures, the same references denote identical or similar elements. It should be noted that, for clarity purposes, some element(s) may not be represented at scale.

Figure 1:
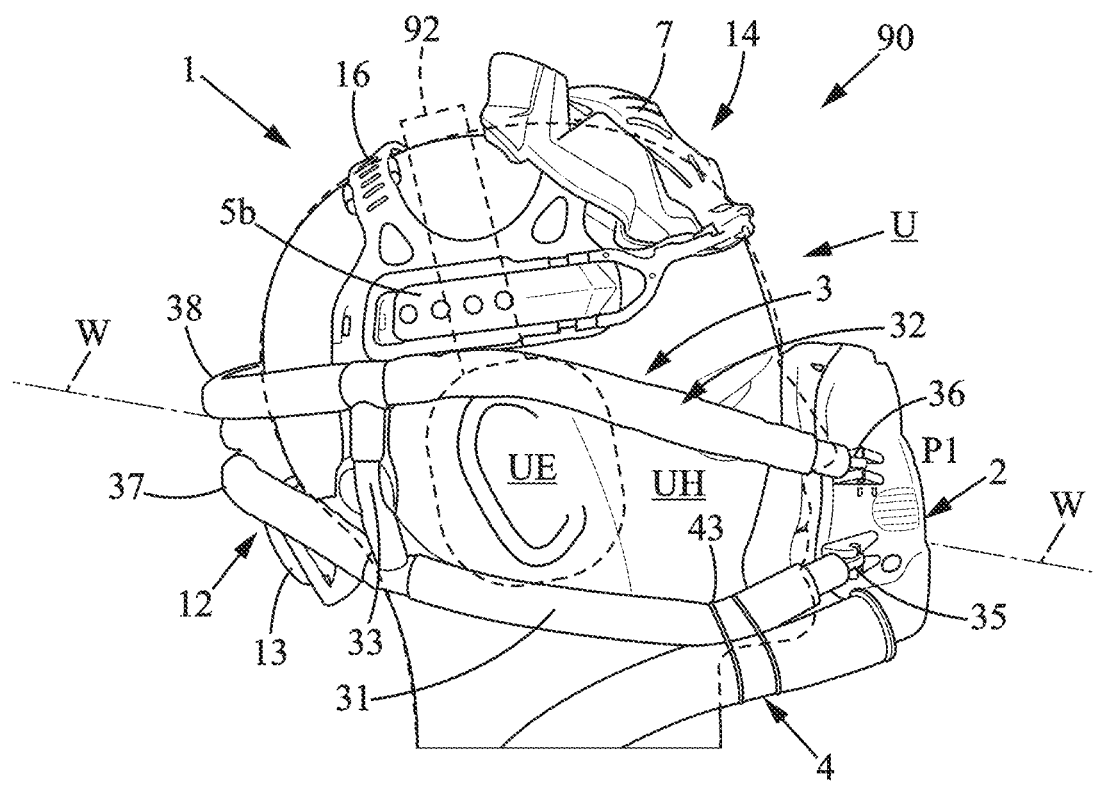
FIG. 1 shows a respiratory equipment according to the present disclosure, with the respiratory mask in use position.

As shown in FIG. 1, an aircraft pilot denoted U wear a respiratory equipment 90 in a use position denoted P1. Instead of a pilot, the user of the respiratory equipment 90 can be a first officer of the aircraft.

The user U of the respiratory equipment can be a male individual or a female individual; anthropometrics can vary from one subject to another, notably size of head, height of the neck, and generally all anthropology metrics.

Also hairstyle can vary from one subject to another; some people have short hair, some people have long hair. The number of female pilots/copilots is increasing and the proposed respiratory equipment shall be compatible with horsetail/ponytail hairstyle.

Also some male pilots like to wear beard or moustache. Again here many beard styles are considered, as far as hair length or areas covered. The proposed respiratory equipment shall be compatible with most popular beard styles.

Head Armature

There is provided a head armature 1 mounted on the user's head UH. In the illustrated example, the head armature is secured to the user's head UH. The head armature is removably secured to the user's head UH, i.e. when the pilot sits, he/she puts the head armature on, when the pilot intends to leave the seat, he/she quits the head armature.

The head armature comprises at least an occipital member 12 and a front cradle 14. The front cradle 14 (or "forehead cradle") is designed for receiving and lodging the respiratory mask 2 in a position named waiting position P2.

The occipital member 12 can also be called "occipital support" or "occipital plate" since its purpose is to distribute and spread the pulling effort exerted by the inflatable harness in order to avoid a too intense localized pressure on the back of the head. Comfort and stability are optimized with the occipital member 12 having a bearing area of at least 5 $cm^2$, preferably at least 10 $cm^2$.

The occipital member 12 may be made of hard synthetic material, a reinforced plastic or the like, PET, PP, etc. The occipital member 12 can be somewhat flexible to follow the curvature of the skull occipital area.

In the shown example, the head armature 1 comprises a top strap 16. The top strap 16 bears on the top of the user's head along a transversal direction T.

To complete the geometrical references, direction Z denotes vertical direction, direction W defines a substantially front-rear direction (otherwise called "fore-aft" direction), from the occipital arear to the mouth area, SGP defines a medial sagittal plane, symmetrically separating the left and right portion of the user's head.

In the shown example, the head armature comprises a left parietal bearing element 5a, and a right parietal bearing element 5b.

In one example, each parietal bearing element forms a socket for the attachment of headsets, as explained later.

The head armature 1 may comprise one or two occipital straps 17, 18 linking the occipital member to the parietal bearing elements. More precisely, there is provided a left occipital strap 17 linking the occipital member to the left parietal bearing element, and a right occipital strap 18 linking the occipital member to the right parietal bearing element.

One or more part of the head armature 1 is advantageously adjustable to conform to the head size of the user of interest.

The two occipital straps 17, 18 have a length adjustment system, preferably controlled by a rotary knob 13. When the rotary knob 13 is turned to the right, this shortens/pulls the two occipital straps, conversely when the rotary knob 13 is turned to the left, this extends the two occipital straps, and/or let the two occipital straps move away from one another, as it is illustrated in FIG. 10, as known per se.

The top strap 16 can also have a length adjustment system, with pin and slots, or the like, continuous or discontinuous.

Figure 6:
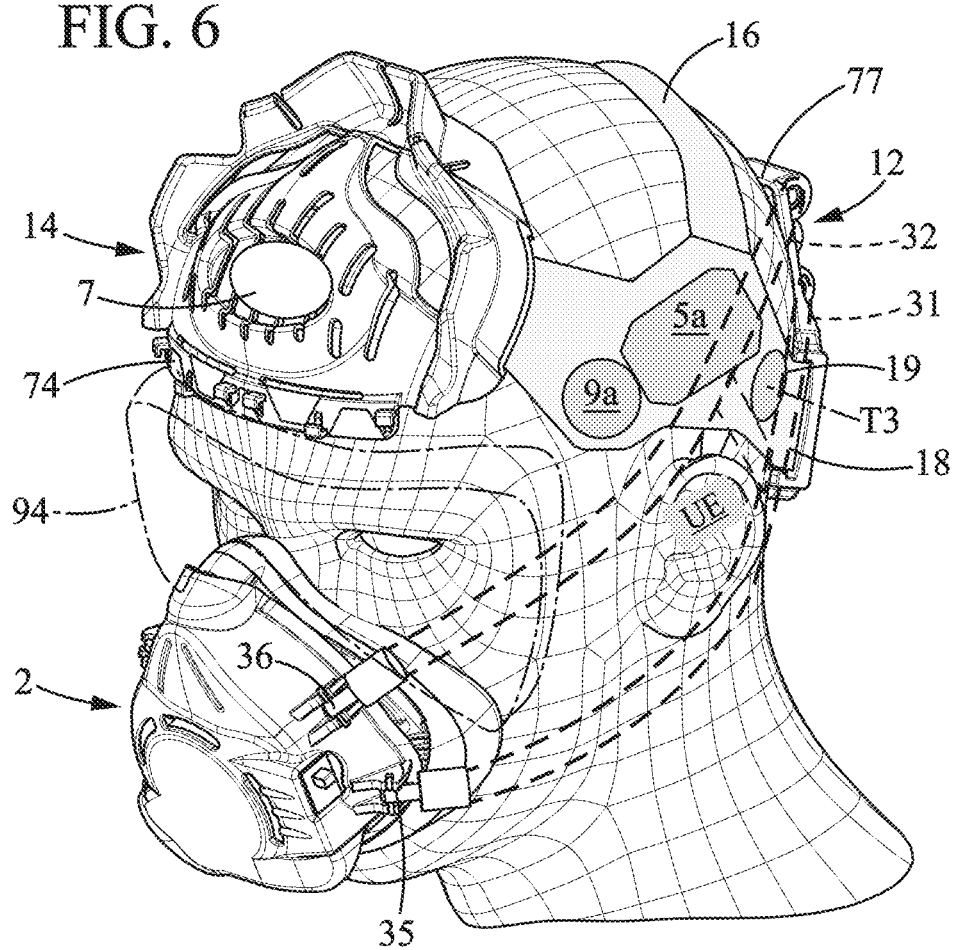
FIG. 6 shows a diagrammatic perspective view of a respiratory equipment according to the present disclosure, the respiratory mask in use position.

In a possible configuration, the two occipital straps 17, 18 are rotatably mounted with regard to the parietal bearing elements 5a,5b at articulations denoted 19 (axis denoted T3, see FIG. 6).

Regarding compatibility with a large anthropometric range, the head armature 1 is such that length, width, perimeter are comprised in the following ranges, for a large sample comprising men and women.

Perimeter at the forehead—occipital plane is in the range [520 mm-610 mm] with a centering about 560 mm.

Length along the sagittal plane is in the range [175 mm-210 mm] with a centering about 190 mm.

Width at the temporal areas is in the range [135 mm-170 mm] with a centering about 155 mm.

The front cradle 14 is arcuate and flexible such that the internal wall can follow the front and top of the skull of the user U.

The front cradle 14 comprises retention means for maintain therein the respiratory mask in the waiting position. In a possible solution, the retention means may be a magnet and counterpart (e.g. ferromagnetic part). The retention means may alternately be formed by complementary shapes cooperating with one another. The retention means may also be hooks&loops straps (Velcro™). Advantageously said retention means prevent an inadvertent fall of the respiratory mask in case of air turbulence and/or shaking, or if the user U bends forwards. Detachment force is not too high, preferably the detachment force is comprised 20 N and 40 N.

The head armature 1 may be made of synthetic material a reinforced plastic or the like, PET, PP, etc. . . . There may be provided a metallic armature therein.

The head armature may comprise foam pads 75,76,77 interposed between the head armature 1 and the user's head (UH); this improves comfort, and this increases acceptance of permanent wear.

In particular, there may be provided foam pads 77 between the occipital member 12 and the user's head rear portion. There may be provided foam pads 75,76 between the front cradle 14 and the user's head forehead as illustrated in FIG. 8.

Foam pads can exhibit a thickness comprised between 2 mm and 5 mm. They are preferably alveolar such that air can go through, thereby preventing sweat from user at contact points. They are preferably made from polyurethane foam.

There is provided in the head armature 1 a vibrator device 7. More precisely the vibrator device 7 is located in the front cradle 14, the utility of which will be explained later. As will be seen later, the head armature 1 may comprise bone conduction loudspeakers and may comprise bone conduction microphone.

Weight of the head armature 1 alone is less than 400 grams, less than 700 grams if we include vibrator device 7 and bone conduction loudspeakers.

Respiratory Mask

The respiratory mask 2 comprises a body 20 and a face seal 25, arranged generally in a known manner thus not described in details here. The face seal 25 is arranged generally along a seal plane denoted SP.

As already mentioned the respiratory mask 2 has at least two positions of interest, namely a use position P1 where the mask is tightly applied to the mouth UM and nose UN the user, and a waiting position P2 where the mask is retained at the front cradle 14.

However, it should be noticed that preferably the respiratory mask does not comprise the oxygen regulator. Here, the oxygen regulator 6 is arranged at distance from the mask 2.

There is provided in the mask a compensated exhaust valve 27 for air exhaustion, such device is known per se. The exhaust valve 27 is located in the mouth area configured to stand opposite the mouth UM of the user U.

There may be provided in the mask a small size microphone 8, for audio communications. The microphone 8 is located in the mouth area configured to stand opposite the mouth UM of the user U.

There is provided a fluid inlet connector 40 to which a respirable gas tube 4 is connected in normal conditions. The respirable gas tube 4 is flexible and is coupled to a regulator 6 arranged away from the respiratory mask 2 itself. The respirable gas tube, also called gas supply conduit 4 or in short 'O2 pipe', is preferably equipped with a fixing clamp 61, for attachment on a belt/safety harness. The respirable gas tube 4 has a cross section of at least 50 mm$^2$, it may contain therein another smaller pipe for harness inflation (see below).

There are provided attachment means for attaching the mask 2 to the inflatable harness that will be described below. Regulator 6 is known per se thus not described in detail here.

The regulator 6 can be for example an 'on-demand' regulator, i.e. respirable gas is supplied from the regulator 6 when the pressure downstream the regulator 6 is lower than the environmental pressure, without excluding a forced mode as known.

Weight of the mask (without regulator) is less than 500 grams, preferably less than 400 grams.

Inflatable Harness

There is provided an inflatable harness 3 configured to be coupled to a pressurized gas source. In the shown example, the inflatable harness 3 comprises lower inflatable tube 31 and an upper inflatable tube 32. The lower inflatable tube 31 comprises a left portion 31L and a right portion 31R. The upper inflatable tube 32 comprises a left portion 32L and a right portion 32R. At the back of the head, the inflatable harness is fixed to the occipital member 12. At the front area, the inflatable harness is coupled to the respiratory mask 2.

The principle of such an inflatable harness has been known for a long time; it is illustrated for example in the documents U.S. Pat. No. 3,599,636 or EP0288391.

For example, each of the inflatable tube 31, 32 is made up of an inner tube of elastic material contained in an inextensible sleeve limiting the lengthening of the tube. The resting length of the inner tubes is such that they tend to apply the mask onto the face with sufficient pressure for providing the required tightness, whatever the outside pressure.

There are provided spacer members 33, one of the left side and one of the right side. For each spacer member 33, one of its end is coupled to the lower inflatable tube 31 while the other end coupled to the upper inflatable tube 32. Therefore, thanks to the space provided between lower 31 and upper 32 inflatable tubes, there is advantageous enough room to accommodate comfortably the ears UE of the user. In practice, as shown at FIGS. 1 and 6, in the use position P1, the lower inflatable tube 31 passes below the ears UE of the user, the upper inflatable tube 32 passes above the ears of the user, there is no mechanical stress on the ears of the user, thus ensuring comfort and causing no trouble to audio communications.

In the shown example, spacer members 33 are arranged slightly aft the mid-distance between front portion and back portion of the inflatable tubes, corresponding to the back of the user's ear UE.

At the occipital member area, the lower inflatable tube 31 is coupled to the occipital member 12 at a first attachment point 37, and the upper inflatable tube 32 is coupled to the occipital member 12 at a second attachment point 38, arranged at distance from the first attachment point 37.

In other words, the lower inflatable tube 31 and the upper inflatable tube 32 of the inflatable harness are fixed at a predefined distance D3 from one another. Advantageously it distributes and spreads bearing efforts on the back of the user's head when the mask is in use position P1 since the tubes undergo a pulling stress in use position. Also, it favours lower and upper inflatable tubes 31,32 be spaced enough to run both side of user's ear in use position P1, without squeezing the ear.

An inflation of the inflatable harness causing an extension of the inflatable harness such that the respiratory mask 2 can be brought opposite the mouth and nose of a user, and a purge of the inflatable harness causing either a constrained application of the inflatable harness against the mouth UM and nose UN of a user U, or an application (less constrained) on the front cradle 14.

There is provided control tabs 28,29 arranged at the front area of the mask so that the user can grasp these tabs to handle the respiratory mask 2. At least one of these control tabs 28,29 is movable with regard to the mask body 20. When the control tabs 28,29 are pressed to one another, a valve is actuated to inflate the lower and upper inflatable tubes 31,32.

Figure 4:
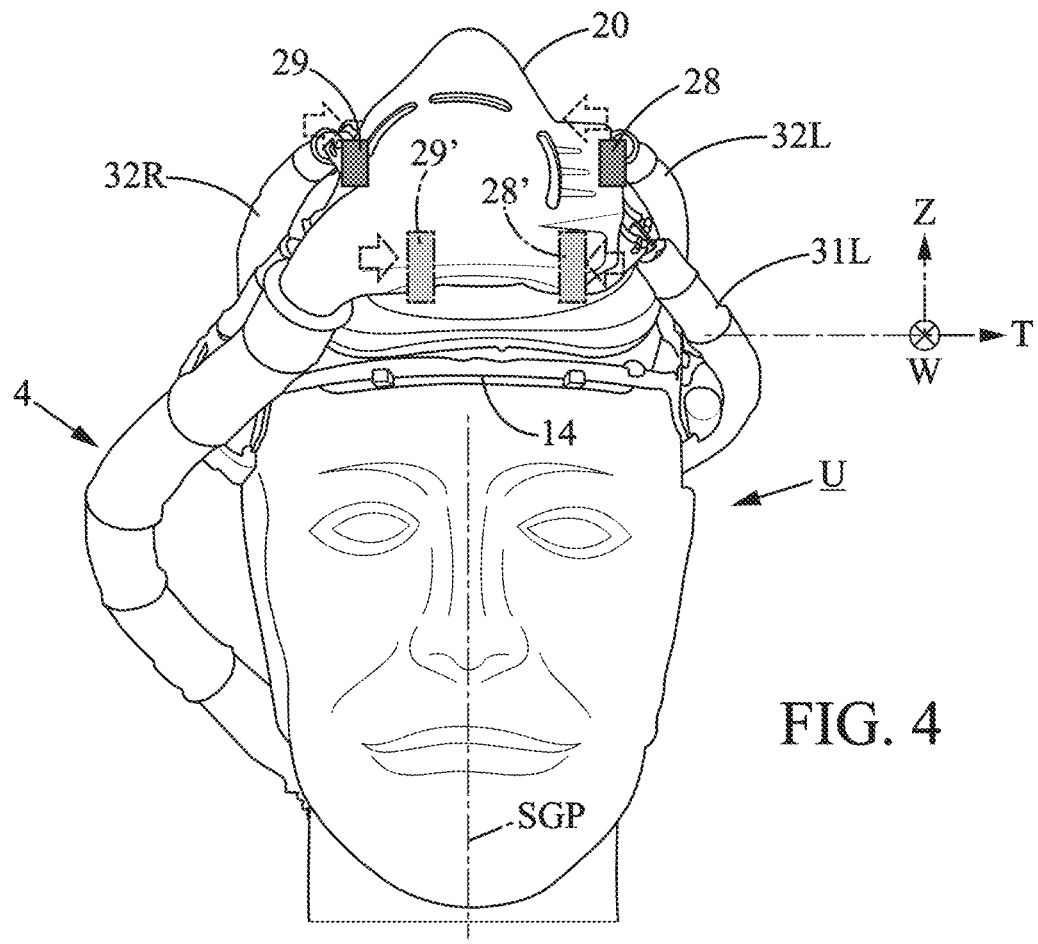
FIG. 4 shows the respiratory equipment as viewed from the front side in the configuration of FIG. 2.

Alternate possible locations for the control tabs are shown at references 28',29' at FIG. 4. The control tabs 28,29 are preferably of large sized to be easily grasped by the user The control tabs 28,29 are preferably of red color.

Figure 5:
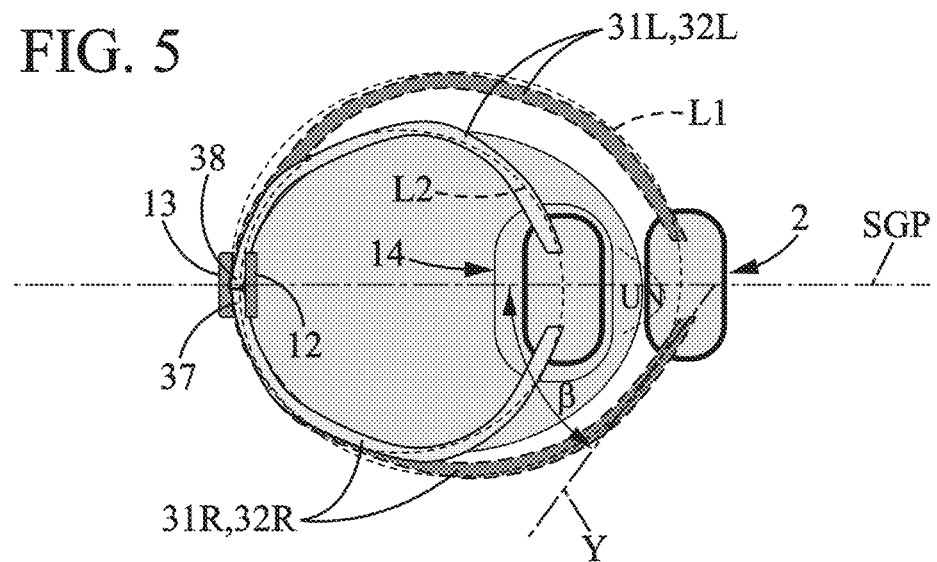
FIG. 5 shows a diagrammatic top view of a respiratory equipment according to the present disclosure, with the inflatable harness both in the inflated configuration (dotted lines) and in the purged configuration.

More precisely, as illustrated at FIG. 5, the length L1 of the inflatable tubes 31,32 in the inflated state is at least 130% compared with the length L2 of the inflatable tubes in the purged state. The user can easily pass the mask 2 and harness around the face even when wearing glasses, long nose UN.

Said otherwise ratio L1/L2 is at least 1,3. Another possible configurations, ratio L1/L2 can be at least 1, 2 or ratio L1/L2 can be at least 1,4.

A typical L1/L2 is 1,5, said otherwise length L1 of the inflatable tubes in the inflated state is at about 150% compared with the length L2 of the inflatable tubes in the purged state.

The inflatable harness is coupled to the respiratory mask 2. In one exemplary solution, there is provided a flexible attachment.

The lower inflatable tube 31 is coupled to the respiratory mask 2 at a first attachment point 35 at left side and another attachment at right side. At one of the attachments, there is provided a fluid connection between one gas circuit inside the mask and the interior volume of the inflatable tube. Gas or air is flowing through this fluid connection whenever inflatable tube undergoes inflation or purge.

Similarly, the upper inflatable tube 32 is coupled to the respiratory mask 2 at a second attachment point 36 at left side and another attachment at right side at left side. At one of the attachments, there is provided another fluid connection between one gas circuit inside the mask and the interior volume of the inflatable tube. Gas or air is flowing through this fluid connection whenever inflatable tube undergoes inflation or purge. There is a valve in the mask, operated via the control tabs 28,29, to selectively open or close the gas flow into/out the inflatable tubes. This valve can be supplied from a specific pipe at a pressure for example comprised between 3 bars and 6 bars (for quick inflation). The specific pipe for harness inflation can be housed within the respirable gas conduit 4, the specific pipe has a substantially smaller section than the respirable gas conduit 4.

According to another solution, the interior volumes of upper and lower inflatable tubes may be fluidly connected together in another location, thereby necessitating only one fluid connection between the inflatable harness and the respiratory mask 2.

Flexible attachment between the inflatable harness and the respiratory mask allows an optimized comfort with regard to the different shapes of the users face. At the mask attachments, the inflatable tubes, when inflated, are wide open at the mask attachments, which eases the installation of the mask, even when the user wears glasses.

At the coupling area where the inflatable harness is coupled to the respiratory mask 2, there may be provided an angular stop such that the angle β of each tube of the harness with regard to the sagittal plane is at least 30°, as illustrated at FIG. 5. Angle β separates direction Y from direction SGP, where Y denotes the tangent direction of the tube at the mask attachment.

At the mask interface, the inflatable tubes when inflated or purged, are forced to be angularly open (for example at least 30°, or at least 40°) which eases the installation of the mask, even when the user wears glasses. This provides a wide passage along a direction T, in the inflated state, the inflatable tubes exhibit a circular or elliptic shape (i.e. in a plane T,W).

It shall be understood that flexibility of the attachment is not incompatible with the presence of an angular stop.

There may be provided a comfort adjustment system, wherein a partial pressure can be injected into the lower and upper inflatable tubes 31,32 in order to slightly release the squeezing pressure in use position P1.

The two inflatable tubes 31,32 are kept away from one another by the gap D3 at the occipital member 12 and the two spacers members 33. Here we note that the number of spacers members 33 can be three, four, or more.

Even though two inflatable tubes are shown at the figures, a configuration with only one inflatable tube is also considered, since a good stability is provided by the head armature.

Audio Headsets

Regarding audio headsets, various options are available including options that can be chosen from the user standpoint.

Figure 3:
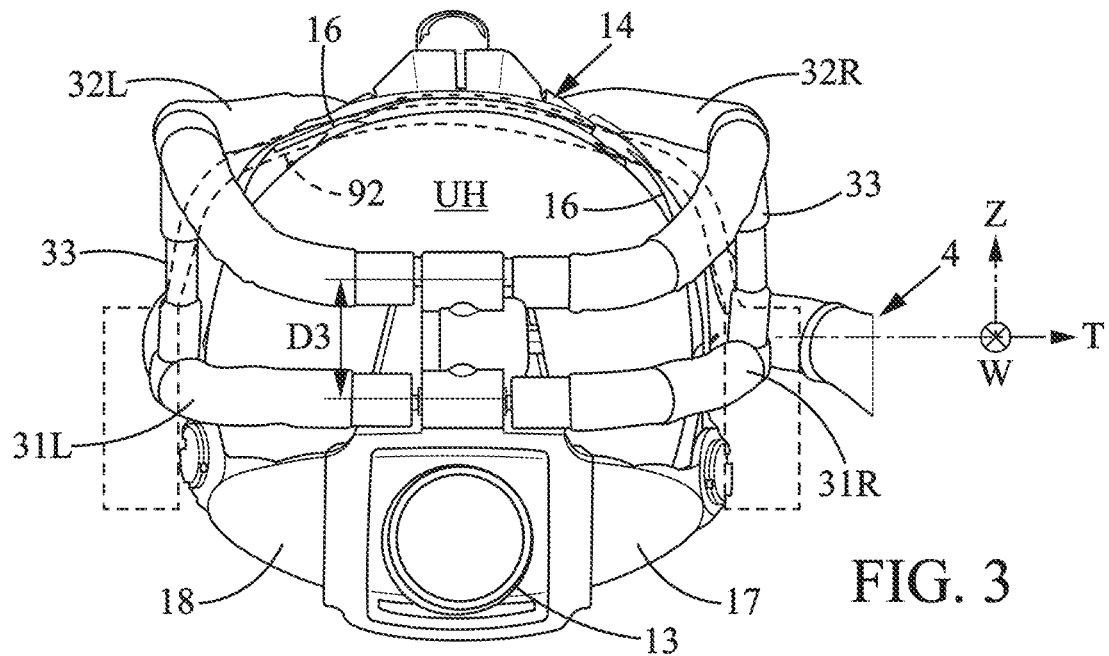
FIG. 3 shows the respiratory equipment as viewed from the back in the configuration of FIG. 2.
Figure 9A:
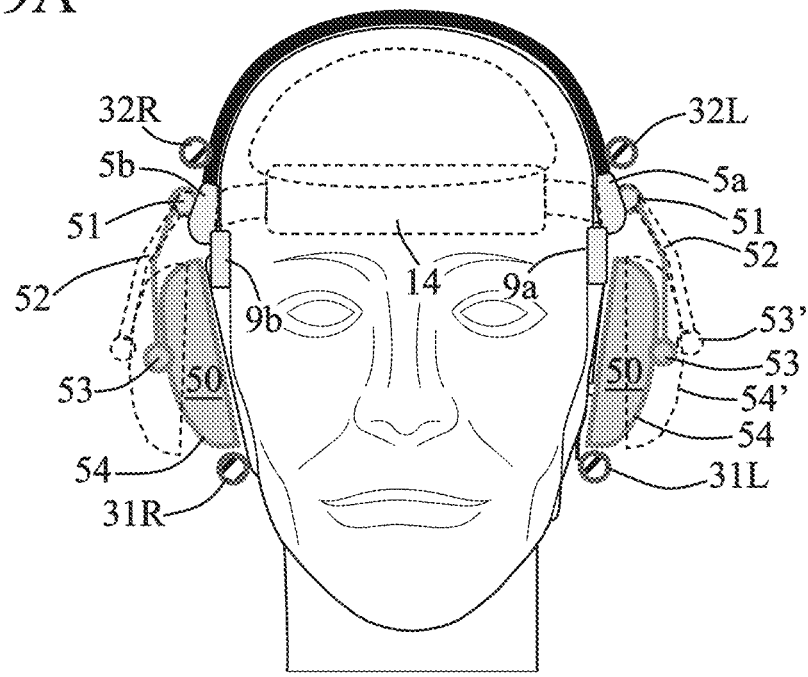
FIGS. 9A and 9B show diagrammatic front views of a respiratory equipment according to the present disclosure, with headsets in the use configuration and in the release configuration, with the inflatable harness both in the use position and in the waiting position.
Figure 9B:
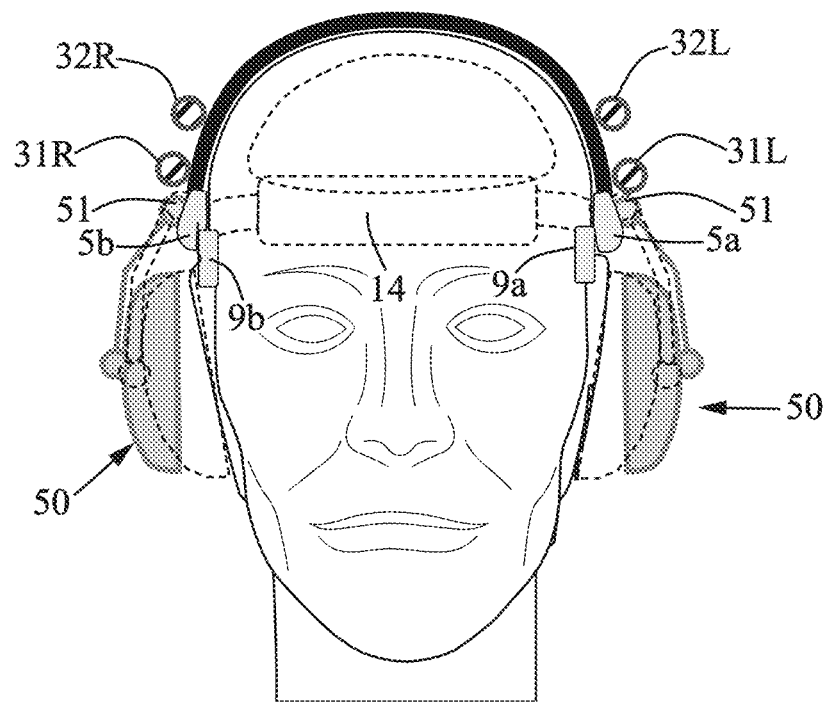

According to a first option the user may use his/her personal headset 92, as illustrated in dotted lines at FIG. 1. In this case, the personal headset 92 is installed above the inflatable harness 3. In some configurations, the user puts his/her personal headset 92 around his/her neck when it is not used. However, we note here that in the waiting position P2, as illustrated in dotted lines at FIG. 3, the personal headset 92 can also be installed above the inflatable harness 3. Therefore, in practice, the proposed respiratory equipment is advantageously compatible with the personal headset 92 of the user According to a second option, the user U may use a headset 50 adapted to be installed with the head armature 1, as illustrated at FIGS. 9A & 9B.

The left headset comprises an attachment socket 51 with an articulation having a front-rear axis. There are provided two stable positions; one is shown in full lines another one in dotted lines. One stable position corresponds to the headset pressed against the ear for practicing audio communications, and another stable position corresponds to the headset substantially away from the ear.

There is provided an arm 52, and the ear cup device (headphone cup) 54 with an attachment 53 to the arm 52. The right headset is similar but symmetrical to the left one with regard the sagittal plane SGP.

The left headset is attached to the left parietal bearing elements 5a, the right headset is attached to the right parietal bearing elements 5b.

Advantageously it should be noted that when the pilot lowers the respiratory mask 2 together with the lower inflatable tube 31, it will constrain the left and right headset 50 to change into or remain in the stable position corresponding to the headset pressed against the ear. Therefore the switch from deck communication to headset communication is performed automatically, which relieved the burden of the pilot in somewhat busy circumstances.

According to a third option, the respiratory equipment may comprise two bone-conduction loudspeakers 9a,9b arranged at the parietal bearing elements. Optionally the two loudspeakers are integrated respectively in the left and right parietal bearing elements 5a,5b. Bone-conduction loudspeakers constitute an efficient solution to render possible provide audio communications, while the ear channel remains free to listen to the environment noises in the flight deck and from outside the aircraft.

There are provided wires to couple the loudspeakers and/or microphone to the onboard audio communication equipment, said wires can advantageously pass along the gas supply conduit 4.

There may be provided a wear condition sensing function, embodied by a specific sensor or taken from the pressure signal waves prevailing on the O2 pipe 4, this wear condition sensing function determines if the respiratory mask 2 is actually used by the user.

In that case it is determined that the respiratory mask 2 is actually used by the user, the avionic control unit switches the audio communication from the flight deck to the loudspeaker provided at the respiratory equipment (whatever the solution) and to the microphone provided that the respiratory equipment (whatever the solution).

Miscellaneous

The respiratory equipment may comprise a vibrator device 7 arranged preferably at the front cradle (integrated or adjacent to). According to the shown example, there may be provided one single vibrator device in a centered position. According to another possibility, there may be provided two vibrator devices arranged respectively at the left and right temporal area. The vibrator device is for example a solenoid, controlled by alternate signal, with a frequency comprised between 5 Hz and 20 Hz (or a mixed frequency signal).

In one embodiment, the vibrator device is controlled from the avionics control units; in some circumstances, for example for cruising altitudes above 41 kfeet and/or if only one pilot is present in the flight deck for cruising altitudes above 25 kfeet, the pilot in charge shall wear the mask in a preventive mode and therefore, when such conditions occur or are bound to occur shortly, the avionics control units cause the vibrator device to vibrate.

This constitutes an intuitive means to give an alert/incentive to wear the mask on the mouth. The vibrations are caused to be interrupted by the avionics control units, if preventive wear condition are no longer prevailing or in case of preventive wear is actually determined by one or more sensor. Actual preventive wear can be sensed through the pressure variations sensed at the mask.

The respiratory equipment may further comprise a visor/goggles device 94 removably attachable on the respiratory mask 2. Thereby, the pilot/user can put this eye protection when he/she wishes to or under any required conditions. It shall be understood that the goggles device 94 can stay attached to the mask even in the waiting position P2. The goggles device 94 may form a shield and may have a seal at the face contact.

The respiratory equipment may comprise a miniaturized microphone 8 arranged in the respiratory mask 2. Audio communications is therefore rendered possible and efficient thanks to the integrated microphone.

It is to be noted that bone-conduction technique can also be used for the microphone. Therefore, instead of a piezo microphone, bone-conduction microphone can be arranged at the temporal area together with or next to the already mentioned loudspeakers 9a,9b.

Figure 2:
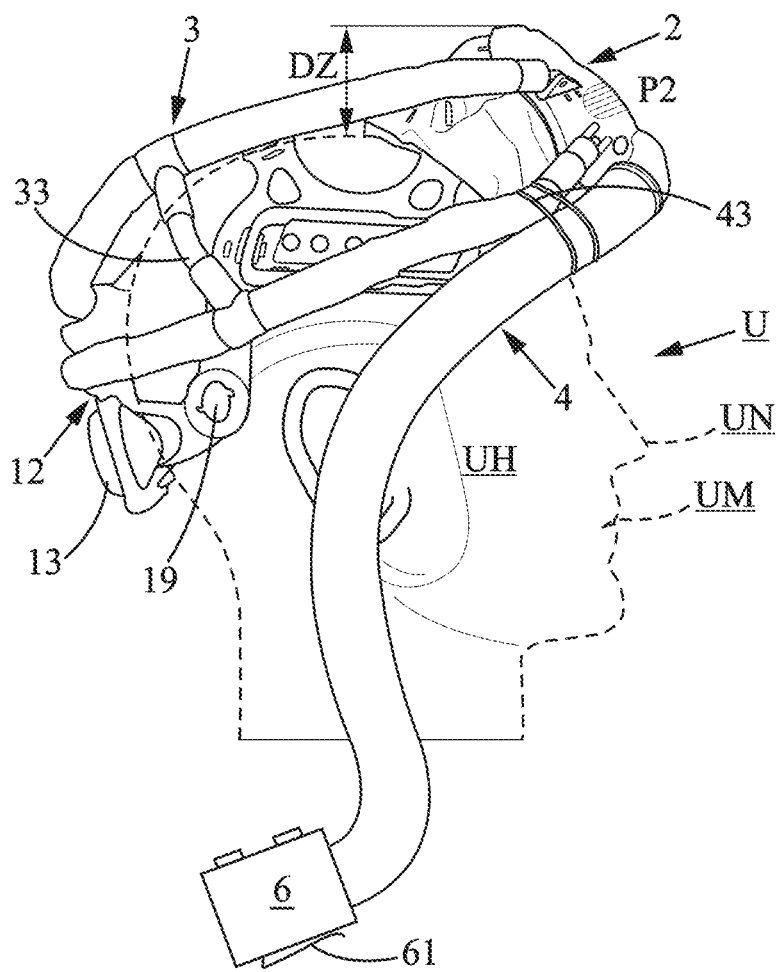
FIG. 2 is analogous to FIG. 1 and shows the respiratory equipment, with the respiratory mask in a waiting position.

As illustrated in FIGS. 1 and 2, there may be provided a linking member 43 to maintain together the flexible gas supply conduit 4 and the lower inflatable tube 31 of the inflatable harness. Advantageously the flexible gas supply conduit 4 is held toward the back of the head and exhibits no hindrance for the pilot in the front area; hence the user U has freedom to use conveniently his/her arms.

The respiratory mask exhibits a thickness E along a direction generally perpendicular to the seal plane SP, with E<70 mm. Overall size is thus reduced when compared to mask with regulator included therein.

Under another perspective, when the respiratory mask is in the waiting position P2, the respiratory mask forms a vertical projection DZ from the top of the head of the user (i.e. along Z direction), said vertical projection is less than 50 mm. This provides freedom of movement for user U and avoids interference with the top wall of the flight deck.

The respiratory equipment may further comprise a sensor configured to detect a condition when the respiratory mask is in the use position P1, and therefore the avionics system automatically switches audio channel to the microphone and loudspeakers provided in the respiratory equipment.

As illustrated in FIG. 10, the rotary controlled length adjustment of the occipital straps 17,18 can be designed with a rack and pinion principle. The rotary knob 13 has a toothed ring 13a. The left occipital strap 18 has a toothed portion 18a which engages the toothed ring 13a. The right occipital strap 17 has a toothed portion 17a which engages the toothed ring 13a, in a diametrically opposed position. When the rotary knob 13 is rotated clockwise, the left and right occipital strap 17 get closer (the occipital link shortens), whereas when the rotary knob 13 is rotated counterclockwise, the left and right occipital strap 17 moves away from one another (the occipital link extends).

The invention claimed is:

1. A respiratory equipment for an aircraft, wherein a pilot or first officer of the aircraft forming a user of the respiratory equipment, the respiratory equipment comprising:
   a head armature, configured to be worn on the user's head,
   a respiratory mask configured to be applied, in a use position around the mouth and nose of a user,
   an inflatable harness configured to be coupled to a pressurized gas source, an inflation of the inflatable harness causing an extension of the inflatable harness such that the respiratory mask is configured to be brought opposite the mouth and nose of the user, and a purge of the inflatable harness causing a constrained application of the inflatable harness against the mouth and nose of the user,
   wherein the head armature comprises an occipital member, and a front cradle for receiving and lodging the respiratory mask in a waiting position, the front cradle comprising a retention means configured for maintaining therein the respiratory mask in the waiting position,
   wherein the inflatable harness is fixed to the occipital member and the inflatable harness is coupled to the respiratory mask.

2. The respiratory equipment according to claim 1, wherein the head armature comprises one or two occipital straps, with a length adjustment system.

3. The respiratory equipment according to claim 1, wherein the head armature comprises a top strap.

4. The respiratory equipment according to claim 1, wherein the head armature comprises a left parietal bearing element, and a right parietal bearing element.

5. The respiratory equipment according to claim 4, wherein each of the left and right parietal bearing elements forms a socket for an attachment of headsets.

6. The respiratory equipment according to claim 4, further comprising two loudspeakers at the left and right parietal bearing elements.

7. The respiratory equipment according to claim 1, wherein the head armature comprises foam pads configured to be interposed between the head armature and the user's head.

8. The respiratory equipment according to claim 1, wherein there is provided, on the respiratory mask, at least one harness inflation control tab, which triggers, when depressed, an inflation of the inflatable harness.

9. The respiratory equipment according to claim 1, further comprising a vibrator device.

10. The respiratory equipment according to claim 1, further comprising a miniaturized microphone arranged in the respiratory mask.

11. The respiratory equipment according to claim 1, further comprising a bone-conduction microphone, arranged in the head armature.

12. The respiratory equipment according to claim 1, wherein the inflatable harness comprises two inflatable tubes kept away from one another by spacers members.

13. The respiratory equipment according to claim 12, wherein at a coupling area where the inflatable harness is coupled to the respiratory mask, there is provided an angular stop such that an angle of each tube of the two inflatable tubes of the harness with regard to the sagittal plane is at least 30°.

14. The respiratory equipment according to claim 12, wherein the two inflatable tubes comprise a lower inflatable tube and an upper inflatable tube, wherein on the occipital member, the lower inflatable tube and the upper inflatable tube of the inflatable harness are fixed at a predefined distance from one another.

15. The respiratory equipment according to claim 12, wherein the inflatable harness is configured such that a length of the inflatable tubes in the inflated state is at least 130% compared with the length of the inflatable tubes in the purged state.

16. The respiratory equipment according to claim 1, wherein at a coupling area where the inflatable harness is coupled to the respiratory mask, there is provided a flexible attachment.

17. The respiratory equipment according to claim 1, further comprising a gas regulator arranged away from the respiratory mask.

18. The respiratory equipment according to claim 1, wherein the occipital member exhibits a bearing area of at least 5 cm$^2$ (0.77 square inches).

19. The respiratory equipment according to claim 1, further comprising a visor device removably attachable on the respiratory mask.

* * * * *